United States Patent Office 3,823,184
Patented July 9, 1974

---

3,823,184
16,17-SECO-Δ⁴,⁶ STEROIDS
Pierre Crabbé, Mexico City, Mexico, and John A. Edwards, Los Altos, and John H. Fried, Palo Alto, Calif., assignors to Syntex (U.S.A.) Inc., Palo Alto, Calif.
No Drawing. Filed May 12, 1971, Ser. No. 142,739
Int. Cl. C07c 49/56, 69/14, 69/24, 69/74, 69/78
U.S. Cl. 260—488 B       13 Claims

ABSTRACT OF THE DISCLOSURE

The novel 16,17-secoestra-4,6-dienes, 16,17-seco-13-alkylgona-4,6-dienes and the 14β-isomers thereof useful as antiandrogenic agents and methods for their preparation.

---

The present invention relates to novel 16,17-seco steroids of the estrane and gonane series.

More particularly, this invention relates to certain novel 16,17-secoestra-4,6-dienes, and 16,17-seco-13-alkyl-gona-4,6-dienes, as well as the 14β-isomers thereof.

These compounds are represented by the formula:

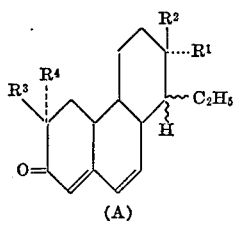

(A)

wherein $R^1$ represents lower alkyl, hydroxymethyl and the conventional hydrolyzable esters and ethers thereof, carboxy (COOH) and the esters thereof, acetyl or a hydroxylated hydrocarbon radical represented by the formulas:

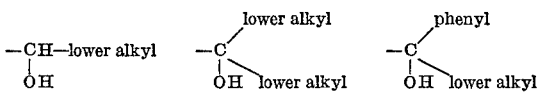

and the conventional hydrolyzable esters and ethers thereof,
$R^2$ represents lower alkyl;
$R^3$ and $R^4$ represent hydrogen or methyl;
provided that $R^4$ is methyl when $R^3$ is methyl.

The wavy lines at C-14 indicate the α or β configuration for the hydrogen atom and the ethyl group at said position.

These compounds have asymmetric carbon atoms and the various steroisomers are included within the scope of this invention.

The term "lower alkyl" as used herein refers to straight or branched alkyl groups containing up to 4 carbon atoms, e.g. methyl, ethyl, n-propyl, isopropyl, n-butyl and the like.

The term "conventional hydrolyzable esters and ethers" as used herein refers to hydrolyzable carboxylic ester and ether groups known conventionally employed in the art. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical ester groups include acetate, propionate, butyrate, trimethylacetate, 3-methylpentanoate, enanthate, caprylate, trimethylacetate, pelargonate, decanoate, undecenoate, benzoate, phenylacetate, diphenylacetate, cyclopentylpropionate, methoxyacetate, aminoacetate, diethylaminoacetate, trichloroacetate, β-chloropropionate, bicyclo-[2.2.2]-octane-1'-carboxylate, adamantoate, and the like. Typical ether groups are methyl ether, ethyl ether, cyclopentyl ether, cyclohexyl ether, propyl ether, tetrahydropyran-2'-yl ether, tetrahydrofuran - 2' - yl ether, 4'-methoxytetrahydropyran-4'-yl-ether, propyl ether, and the like.

The compounds of the present invention are valuable pharmaceutical agents possessing anti-androgenic activity. They are of particular utility for the treatment of hyperandrogenic conditions such as acne, prostatic hypertrophy, hirsutism in the female, seborreic dermatitis and the like.

The compounds of the present invention are obtained by a process illustrated by the following sequence:

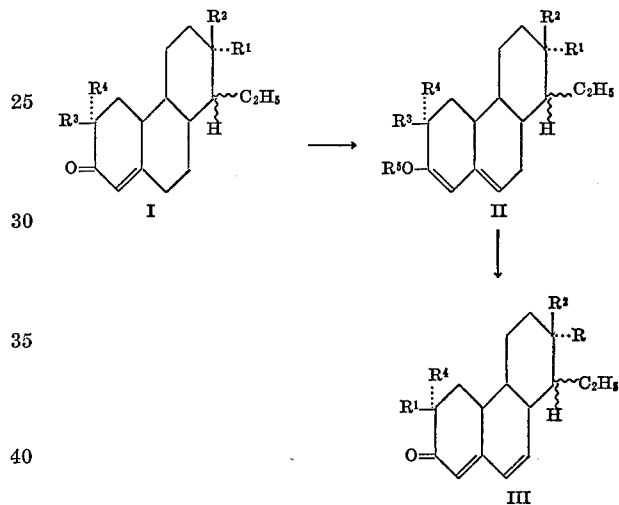

Wherein $R^1$, $R^2$, $R^3$ and $R^4$ have the above-indicated meaning, $R^5$ represents lower alkyl of 1 to 4 carbon atoms.

In practicing the process illustrated above a 3-keto-16,17-secoestr-4-ene, a 3-keto-16,17-seco-13-alkylgon-4-ene or the 14β-isomers thereof (I) is treated with a lower alkyl orthoformate in the presence of an acid catalyst, to yield the corresponding 3-alkoxy-Δ³,⁵ compound (II).

The preferred alkyl orthoformates used are ethyl orthoformate and methyl orthoformate. Suitable catalysts are p-toluenesulfonic acid, sulfuric acid, perchloric acid and the like. The reaction is conducted under substantially anhydrous conditions, in an inert solvent, at a temperature comprised between approximately 0° C. and room temperature, for a period of time of between 10 minutes and 1 hour. The reaction is preferably conducted in dioxane or methylene chloride as solvent in the presence of p-toluenesulfonic acid and at room temperature, however, the solvent, the catalyst and the reaction conditions are not critical.

Upon reaction of the 3-enolethers thus formed with approximately 1 molar equivalent of a halogenated benzoquinone, using particularly 2,3-dichloro-5,6-dicyano-1,4-benzoquinone (D.D.Q.) in the presence of an acid catalyst, the desired 3-keto-16,17-secoestra-4,6-diene, 3-keto-16,17- seco-13-alkylgona-4,6-diene or the corresponding 14β-isomers thereof are obtained (III).

The reaction is conducted in an inert solvent, at a temperature ranging from between −40° C. to +10° C., for a period of time of between 30 minutes to 5 hours, and can be followed by ultraviolet spectrum measurements.

It is recommended to use the stoichiometric amount of D.D.Q., or no more than 1.1 molar equivalents, to avoid the formation of by-products. Adequate acid catalysts are strong mineral or organic acids such as anhydrous hydrochloric acid, sulfuric acid, p-toluenesulfonic acid and the like.

Suitable solvents are ethers such as diethylether, dioxane and tetrahydrofuran, aromatic hydrocarbons such as benzene, toluene and the like, and halogenated hydrocarbons such as chloroform, methylene chloride and ethylene dichloride.

The product formed by the above described dehydrogenation reaction is isolated by conventional techniques, for example, by filtration of the insoluble hydroquinone formed during the reaction through an adsorbing material such as alumina, and thereafter eluting the product with a suitable solvent, or by dilution of the reaction mixture with a solvent non-miscible with water followed by washing the organic solution with a dilute solution of sodium or potassium hydroxide until the washings become colorless, and then evaporation of the solvent and purification of the residue by crystallization or chromatography.

In the first step of the process, when the starting material used is 16,17-secoestr-4-en-17-ol-3-one, 16,17-seco-13-alkylgon-4-en-17-ol-3-one or the corresponding 14β-isomers thereof (I, $R^1$=hydroxymethyl) this group can be partially or completely esterified to the formate ester depending upon the reaction time, using the total product of the enol etherification reaction for the dehydrogenation step, and thereafter hydrolyzing the formate ester by alkaline treatment, or separating the free hydroxylated compound and the esterified product by conventional techniques such as fractional crystallization or chromatography.

When a compound having an acid labile group is used as starting material (i.e. compounds possessing a tetrahydropyranyloxy, tetrahydrofuranyloxy or 4'-methoxytetrahydropyranyloxy group), this will be hydrolyzed.

When a 17-acyloxylated compound is used and a free 17-hydroxy compound is desired, the acyloxy group in the $\Delta^{4,6}$-dienes is hydrolyzed by conventional treatment with base.

The 17-hydroxylated compounds can be reesterified or etherified following the conventional esterification and etherification methods known to the skilled in the art, i.e., esterification with an acid anhydride or acid chloride in pyridine solution for the esterification of primary and secondary hydroxyl groups and with carboxylic acid anhydrides in benzene solution and in the presence of an acid catalyst such as p-toluenesulfonic acid or with a mixture of a carboxylic acid-carboxylic anhydride in the presence of an acid catalyst for the compounds having tertiary hydroxyl groups. Enol acylates formed in this step are reconverted to the 3-keto-$\Delta^{4,6}$ system by treatment with DDQ.

Etherification is also carried out by conventional techniques. Thus, reaction with dihydropyran, dihydrofuran, or 4-methoxy-5,6-dihydro-2H-pyran in an inert solvent such as benzene and in the presence of an acid catalyst produces the tetrahydropyran-2'-yloxy, tetrahydrofuran-2'-yloxy or 4'-methoxytetrahydropyran-4'-yloxy derivatives, respectively. Methyl, ethyl and cyclopentyl ethers, for example, can be prepared upon reaction of the hydroxy compound with sodium hydride and methyl iodide, ethyl iodide and cyclopentyl bromide, respectively.

Compounds of formula III wherein $R^1$=hydroxymethyl can be converted into the corresponding acids (III, $R^1$=COOH) by oxidation with chromium trioxide, and the acids can be esterified by conventional methods, such as treatment with an excess of a diazoalkane such as diazomethane or diazoethane in ether solution.

The 2α-monomethyl or 2,2-dimethyl substitution can be present in the starting materials, or alternatively these substituents can be introduced after the introduction of the double bond at C–6. Thus, compounds of formula III ($R^3$ and $R^4$=H) are converted into a mixture of 2-monomethyl and 2,2-dimethyl derivatives by reaction with a methyl halide such as methyl iodide in the presence of potassium t-butoxide, using a mixture containing hexamethylphosphoramide as solvent. The reaction is carried out at a temperature below 0° C., and preferably between −10° C. to −70° C., adding a solution of potassium t-butoxide to a previously cooled mixture of the steroid and methyl iodide in a solution containing hexamethylphosphoramide.

The reaction mixture is maintained at said temperature for a period of time between 30 minutes and several hours, preferably between 4 and 6 hours, isolating the products by conventional techniques such as by dilution with water, separation of the organic phase and evaporation of the solvents, under reduced pressure, or by steam distillation of the solvents followed by extraction of the products with an organic solvent non-miscible with water, and final separation of the 2-monomethyl and dimethyl derivatives by fractional crystallization or chromatography.

The reaction prepares both the 2α-monomethyl and 2,2-dimethyl compounds which can be separated and isolated via conventional methods, such as chromatography.

The $\Delta^4$-3-keto starting materials for the process object of the present invention are obtained from 3-methoxy-16,17-secoestra-1,3,5(10)-trien-17-oic acid methyl ester, 3-methoxy - 16,17 - seco-14β-estra-1,3,5(10)-trien-17-oic acid methyl ester and the corresponding 18-alkyl derivatives thereof (16,17-seco-13-alkyl gonatrienes) in accordance with our copending application Ser. No. 142,763, filed on May 12, 1971 and entitled 16,17-Seco-$\Delta^4$ and -$\Delta^{5(10)}$ Steroids.

Briefly, the methods for producing the same are as follows:

16,17 - secoestr - 4 - en-17-ol-3-one is obtained from 3-methoxy-16,17-secoestra-1,3,5(10)-trien-17-ol. The latter, upon reduction of the aromatic ring under Birch conditions i.e. using an alkaline metal such as lithium in liquid ammonia followed by hydrolysis of the 3-methoxy-2,5(10)-diene intermediate with a strong mineral acid, using particularly a methanolic solution of hydrochloric acid, furnished the desired 16,17 secoestr-4-en-17-ol-3-one. Alternatively, the Birch reduction can be performed on the 17-oic acid followed by reduction of the 17-ol or on the 17-oic acid methyl ester to furnish the 17-ol compound.

Oxidation of 16,17-secoestr-4-en-17-ol-3-one with for example 8N chromium trioxide in acetone solution and in the presence of sulfuric acid (Jones' reagent) or chromium trioxide in pyridine gives rise to 3-keto-16,17-secoestr-4-en-17-oic acid, which in turn is esterified by reaction with an excess of diazoalkane, e.g. diazomethane or diazoethane.

By refluxing 3-methoxy - 16,17 - secoestra - 1,3,5(10)-trien-17-oic acid methyl ester with an excess of a lower alkyl magnesium halide such as methylmagnesium bromide, ethylmagnesium bromide, isopropylmagnesium bromide, and the like in an inert organic solvent for a period of time of the order of 15 to 24 hours, the corresponding 3-methoxy-17-keto-17-alkyl - 16,17 - secoestra-1,3,5(10)-triene compound is produced in mixture with the 3-methoxy-17-hydroxy-17,17-dialkyl compound.

When a 3-methoxy-17-keto-17-alkyl-16,17-secoestra-1,3,5(10)-triene is treated with phenyl lithium in tetrahydrofuran solution or with phenylmagnesium bromide in ether solution, at reflux temperature, there is obtained the 3-methoxy-17-hydroxy-17-alkyl-17-phenyl-16,17-secoestra-1,3,5(10)-triene compound.

Reduction of a 3-methoxy-17-keto-17-alkyl-16,17-secoestra-1,3,5(10)-triene with an alkali metal in liquid ammonia followed by acid hydrolysis of the $\Delta^{2,5(10)}$-diene produced, with hydrochloric acid in aqueous methanol, affords the corresponding 17-hydroxy-17-alkyl-16,17-seco-estr-4-en-3-one compound.

Similarly, by reduction of the 17-trisubstituted compounds i.e., 3-methoxy-17-hydroxy-17,17-dialkyl-16,17-secoestra-1,3,5(10)-triene compounds and 3-methoxy-17-hydroxy-17-alkyl-17-phenyl - 16,17 - secoestra-1,3,5(10)-triene compounds with an alkali metal in liquid ammonia followed by hydrolysis with hydrochloric acid in methanol solution the corresponding 17-hydroxy-17,17-dialkyl-16,17-secoestr-4-en-3-one and 17-hydroxy - 17 - alkyl-17-phenyl - 16,17 - secoestr-4-en-3-one compounds are produced.

17-Acetyl-16,17-secoestr-4-en-3-one is obtained by oxidation of 17-hydroxy-17-methyl - 16,17 - secoestr-4-en-3-one with chromium trioxide in pyridine or Jones reagent.

Oxidation of 3-methoxy - 16,17 - secoestra-1,3,5(10)-trien-17-ol with chromium trioxide in pyridine or with a 8N solution of chromic acid (Jones reagent) gives rise to the corresponding 3-methoxy - 16,17 - secoestra-1,3,5(10)-trien-17-al which is then reduced by chemical or electrochemical methods to the corresponding 17-unsubstituted compound, i.e. 3-methoxy-16,17-secoestra-1,3,5(10)-triene.

The 17-unsubstituted compound is then converted into 16,17-secoestr-4-en-3-one by reduction under Birch conditions followed by hydrolysis with hydrochloric acid.

Similarly, electrochemical or chemical carbonyl reduction of a 3-methoxy-17-keto-17-alkyl-16,17-secoestra-1,3,5(10)-triene compound e.g. 3 - methoxy - 17 - keto-17-methyl-16,17-secoestra-1,3,5(10)-triene produces the corresponding compounds substituted at C–17 by an alkyl group e.g. 3-methoxy-17-methyl - 16,17 - secoestra-1,3,5(10)-triene, which in turn is reduced with an alkaline metal in liquid ammonia, and the 2,5(10)-diene intermediate hydrolyzed with hydrochloric acid to afford the corresponding 17-alkyl-16,17-secoestr-4-en-3-one e.g. 17-methyl - 16,17 - secoestr-4-en-3-one. Chemical carbonyl reduction can be accomplished by, for example, a Wolff-Kishner reduction. A Clemmensen reduction, or thioketal formation followed by treatment with Raney nickel.

The 14β-isomers of the above mentioned compounds as well as the 18-alkylated derivatives (13-alkyl-gon-4-enes) are obtained in a similar manner, starting from 3-methoxy - 16,17 - seco-14β-estra-1,3,5(10)-trien-17-oic acid methyl ester, a 3-methoxy-13-alkyl-16,17-secogona-1,3,5(10)-trien-17-oic methyl ester or the 14β-isomers of the last mentioned compounds.

3-methoxy - 16,17 - seco-14β-estra-1,3,5(10)-trien-17-oic acid methyl ester and the 18-alkyl derivatives thereof are in turn obtained from 14β-estrone or an 18-alkyl derivative thereof, by conversion into the enol acetate, treatment of the latter compound with osmium tetroxide followed by decomposition of the osmate ester with sodium bisulfite to give the 16α-hydroxy-3-methoxy-14β-estra-1,3,5(10)-trien-17-one (16α-hydroxy-14β-estrone) or an 18-alkyl derivative, which upon reaction with 1.1 molar equivalents of periodic acid in aqueous pyridine affords a 3 - methoxy-16-hydroxy-17-oxa-17α-keto-D-homo-14β-estratriene or the 18-substituted derivative. Treatment of the lactol thus obtained with an excess of an ethereal solution of diazomethane or with methyl iodide in methanol gives rise to 3-methoxy-16,17-seco-14β-estra-1,3,5(10)-trien-16-aldehyde-17-oic acid methyl ester which is reduced by chemical or electrochemical methods to 3-methoxy - 16,17 - seco-14β-estra-1,3,5(10)-trien-17-oic acid methyl ester or the corresponding gonatriene compound. Particularly, the elimination of the aldehyde group is carried out by converting said group into the benzyl acetal upon reaction with benzyl mercaptan in ether and in the presence of boron trifluoride ethereate, followed by desulfurization with Raney nickel.

The following examples illustrate but are not intended to limit the scope of the present invention.

PREPARATION 1

Part A

A mixture of 300 g. of potassium hydroxide and 45 ml. of water is heated to 260° C. in a nickel crucible, 10 g. of estradiol are added and the temperature is then raised to 290–300° C., maintaining this temperature during 45 minutes. At the end of this time, the foaming mass formed is allowed to cool to room temperature, water is added and the reaction mixture let stand at said temperature overnight so the excess of potassium hydroxide dissolved. The aqueous solution is filtered through Celite (diatomaceous earth), and the filtrate is made acidic by the addition of an excess of concentrated hydrochloric acid. The precipitate which forms is collected by filtration, washed with water and air dried, to produce 16,17-secoestr-1,3,5(10)-trien-3-ol-17-oic acid (*trans* doisynolic acid) in almost quantitative yield.

Part B

A solution of 42 g. of 16,17-secoestra-1,3,5(10)-trien-3-ol-17-oic acid in 400 ml. of ethanol is heated to 30–40° C. and treated in an alternative manner with 240 ml. of dimethylsulfate in 240 ml. of methanol and 40% aqueous potassium hydroxide solution, in such a way that the pH of the reaction mixture is maintained alkaline.

After the addition, the reaction mixture is stirred at the same temperature for 2 hours further, water is added and the product extracted with methylene chloride, the organic extract is washed with water to neutral, dried and evaporated to dryness. The solid residue is purified by filtration through 210 g. of Florisil, using hexane as eluant, thus yielding 3-methoxy-16,17-secoestra-1,3,5-(10)-trien-17-oic acid methyl ester.

Part C

A solution of 18 g. of 3-methoxy-17-carboxy-methyl-16,17-secoestra-1,3,5(10)-triene in 200 ml. of anhydrous tetrahydrofuran is added dropwise, under stirring to 18 g. of lithium aluminum hydride in 300 ml. of anhydrous tetrahydrofuran and the reaction mixture is refluxed for 3 hours. The reaction mixture is then cooled and the excess reagent destroyed by careful addition of saturated solution of sodium sulfate and solid sodium sulfate. The resulting mixture is filtered through Celite diatomaceous earth and the filtrate extracted several times with methylene chloride; the combined organic extracts are washed to neutral, dried over sodium sulfate and evaporated to dryness. Chromatography of the residue on silica gel using hexane:ethyl acetate (60:40) as eluant affords 3-methoxy-16,17-secoestra-1,3,5(10)-trien-17-ol.

Part D

A solution of 16.5 g. of 3-methoxy-16,17-secoestra-1,3,5(10)-trien-17-ol in 500 ml. of anhydrous tetrahydrofuran is added in a steady stream to 1.5 liters of liquid ammonia. To the resulting stirred solution are added 16.5 g. of lithium in portions, and the resulting blue solution is stirred for 1 hour further. Methanol is then added dropwise until the blue color is discharged and the ammonia is allowed to evaporate. The product is then extracted with ethyl acetate and the combined organic extracts washed with water to neutral, dried over sodium sulfate and evaporated to dryness under reduced pressure, to give the oily 3-methoxy-16,17-secoestra-2,5(10)-dien-17-ol.

Part E

A mixture of 15 g. of 3-methoxy-16,17-seco-estra-2,5(10)-dien-17-ol, 320 ml. of tetrahydrofuran, 350 ml. of methanol and 670 ml. of 6N-hydrochloric acid is stirred at room temperature for 45 minutes, diluted with ice water and extracted with methylene chloride. The organic extracts are washed with sodium bicarbonate solution and water to neutrality, dried over sodium sulfate and evaporated to dryness under vacuo. Crystallization of the residue from acetone-hexane affords 16,17-secoestra-4-en-17-ol-3-one.

By the same methods starting from 18-methylestradiol and 18-ethyl estradiol, there are obtained as final products 13-ethyl-16,17-secogon-4-en-17-ol-3-one and 13-n-propyl-16,17-secogon-4-ene-17-ol-3-one, respectively.

PREPARATION 2

A solution of 16 g. of 3-methoxy-16,17-secoestra-1,3,5(10)-trien-17-oic acid methyl ester in 250 ml. of anhydrous tetrahydrofuran is treated with an excess (approximately 200 ml.) of 4N methylmagnesium bromide in ether and the mixture is refluxed with the exclusion of moisture for 18 hours. The cooled mixture is cautiously treated with excess aqueous ammonium chloride solution and the product isolated by extraction with methylene chloride. The extract is washed with water, dried over sodium sulfate and evaporated to dryness. The residue is purified by t.l.c. using a mixture of hexane:ethyl acetate (95:5) to produce 3-methoxy-17-methyl-16,17-secoestra-1,3,5(10)-trien-17 - one, and 3-methoxy-17,17-dimethyl-16,17-secoestra-1,3,5(10)-trien-17-ol.

By the same method but using 3-methoxy-13-ethyl-16,17 - secogona - 1,3,5(10) - trien-17-oic acid methyl ester and 3 - methoxy-13-n-propyl-16,17-secogona-1,3,5-(10)-trien-17-oic acid methyl ester as starting materials, there are obtained respectively 3-methoxy-13-ethyl-17-methyl-16,17-secogona-1,3,5(10)-trien - 17 - one and 3-methoxy - 13 - ethyl - 17,17-dimethyl-16,17-secogona-1,3,5(10)-trien-17-ol; and 3 - methoxy - 13-n-propyl-17-methyl - 16,17 - secogona - 1,3,5(10)-trien-17-one and 3-methoxy - 13 - n - propyl-17,17-dimethyl-16,17-secogona-1,3,5(10)-trien-17-ol.

The 17-methyl and 17,17-dimethyl compounds thus obtained are treated in accordance with the methods of Parts D and E of Preparation 1, to produce respectively:

17-methyl-16,17-secoestr-4-en-17-ol-3-one,
17,17-dimethyl-16,17-secoestr-4-en-17-ol-3-one,
13-ethyl-17-methyl-16,17-secogon-4-en-17-ol-3-one,
13-ethyl-17,17-dimethyl-16,17-secogon-4-en-17-ol-3-one,
13-n-propyl-17-methyl-16,17-secogon-4-en-17-ol-3-one and
13-n-propyl-17,17-dimethyl-16,17-secogon-4-en-17-ol-3-one.

PREPARATION 3

Part A

A solution of 10 g. of 3-methoxy-16,17-secoestra-1,3,5(10)-trien-17-ol in 200 ml. of acetone (distilled over potassium permanganate) is cooled to 10° C. and treated under an atmosphere of nitrogen and with stirring, with solution of 8N chromic acid (prepared by mixing 26 g. of chromium trioxide with 23 ml.) of concentrated sulfuric acid and diluting with water to 100 ml.), until the color of the reagent persisted in the mixture. It is stirred for 10 minutes further at the same temperature and diluted with sodium bisulfite solution and water. The product is then extracted with methylene chloride and the organic extract washed with water, dried over sodium sulfate and evaporated under vacuum, thus affording a crude product which upon recrystallization from acetone-hexane gives 3-methoxy-16,17-secoestra-1,3,5(10)-trien-17-al.

A solution of 6 g. of 3-methoxy-16,17-secoestra-1,3,5(10)-trien-17-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3-methoxy-16,17-secoestra-1,3,5(10)-trien-17-al.

Part B

Into the cathode compartment of a divided electrolysis cell provided with a cellulose dialysis membrance, lead electrodes (each electrode measuring 2 cm. x 5 cm. x 1.6 mm.) and a stirrer, is added 4.15 g. of 3-methoxy-16,17-secoestra-1,3,5(10)-trien-17-al and a mixture of 600 ml. of dioxane and 500 ml. of 10% aqueous sulfuric acid (by weight). To the anode compartment is added 40 ml. of the mixture of dioxane and 10% aqueous sulfuric acid. A current density of 0.8 amps./$cm.^2$ is applied for a period of six hours. The reaction is then removed from the cell and concentrated under reduced pressure to a small volume which is then extracted several times with ether. The ether extracts are combined, washed with water and a 5% aqueous sodium bicarbonate solution, dried and evaporated to dryness to furnish 3-methoxy-16,17-secoestra-1,3,5(10)-triene.

The foregoing reactions are repeated with the exception of using 3-methoxy-13-ethyl-16,17 - secogon-1,3,5(10)-trien-17-ol and 3-methoxy-13-n-propyl-16,17-secogona-1,3,5(10)-trien-17-ol as starting materials, to yield 3-methoxy-13-ethyl-16,17-secogona-1,3,5(10)-triene and 3-methoxy-13-n-propyl-16,17-secogona-1,3,5(10)-triene, respectively.

In accordance with the electrochemical reduction set forth in Part B of this Preparation, 3-methoxy-17-methyl-16,17-secoestra-1,3,5(10)-trien-17-one and 3-methoxy-13-ethyl-17-methyl - 16,17-secogona - 1,3,5(10)-trien-17-one are converted into the corresponding desoxy compounds, namely 3-methoxy-17-methyl-16,17-secoestra-1,3,5(10)-triene and 3-methoxy-13-ethyl-17-methyl-16,17-secogona-1,3,5(10)-triene.

The 17-desoxy compounds thus obtained are in turn reduced with lithium in liquid ammonia, in accordance with Part D of Preparation 1, and the 3-methoxy-$\Delta^{2,5(10)}$-intermediates hydrolyzed with hydrochloric acid, as established in Part E of said Preparation to yield respectively 16,17-secoestr-4-en-3-one, 13-ethyl-16,17-secogon-4-en-3-one, 13-n-propyl - 16,17-secogon-4-en-3-one, 17-methyl-16,17 - secoestr-4-en-3-one and 13-ethyl-17-methyl-16,17-secogon-4-en-3-one.

PREPARATION 4

A solution of 2 g. of 3-methoxy-17-methyl-16,17-secoestra-1,3,5(10)-trien-17-one in 250 ml. of anhydrous tetrahydrofuran is added dropwise to a solution of 10 molar equivalents of phenyl lithium in 150 ml. of ether with mechanical stirring and under an atmosphere of nitrogen. The mixture is then refluxed for 5 hours, cooled, poured into ice water and acidified with hydrochloric acid, stirring vigorously for 1 hour. The product is then extracted with methylene chloride and the organic extracts washed with water to neutral, dried over sodium sulfate and evaporated to dryness. Recrystallization of the residue from acetone-hexane yields 3-methoxy-17-methyl-17-phenyl-16,17-secoestra-1,3,5(10)-trien-17-ol.

Upon reduction of 3-methoxy-17-methyl-17-phenyl-16,17-secoestra-1,3,5(10)-trien-17-ol with lithium in liquid ammonia followed by hydrolysis of the $\Delta^{2,5(10)}$-diene intermediate with hydrochloric acid, in accordance with with the methods of Preparation 1, parts D and E, 17-methyl-17-phenyl-16,17-secoestr-4-en-17-ol-3-one is obtained.

In a similar manner, 3-methoxy-13-ethyl-17-methyl-16,17-secogona-1,3,5(10)-trien-17-one and 3-methoxy-13-n-propyl-17-methyl-16,17 - secogona - 1,3,5(10)-trien-17-one are converted respectively into 13-ethyl-17-methyl-17-phenyl-16,17-secogon-4-en-17-ol-3-one and 13-n-propyl-17-methyl-17-phenyl-16,17-secogon-4-en-17-ol-3-one.

PREPARATION 5

A solution of 1 g. of 17-methyl-17-hydroxy-16,17-secoestr-4-en-3-one in 20 ml. of pyridine is added to a mixture of 1 g. of chromium trioxide in 20 ml. of pyridine.

The reaction mixture is allowed to stand at room temperature for 18 hours, and then diluted with ethyl acetate and filtered through Celite, diatomaceous earth, washing the solid with hot ethyl acetate. The combined filtrates are washed well with water, dried over sodium sulfate and evaporated to dryness, thus producing 17-methyl-16,17-secoestr-4-ene-3,17-dione which is purified by crystallization from acetone-ether.

Likewise, 13-ethyl-17-methyl - 17-hydroxy-16,17-secogon-4-en-17-ol-3-one and 13-n-propyl-17-methyl-17-hydroxy-16,17-secogon-4-en-17-ol-3-one are converted respectively into 13-ethyl-17-methyl-16,17-secogon-4-ene-3,17-dione and 13-n-propyl-17-methyl-16,17-secogon-4-ene-3,17-dione.

PREPARATION 6

Preparation 2 is repeated with the exception of using ethereal ethylmagnesium bromide and n-propylmagnesium bromide as reagents instead of methylmagnesium bromide, to produce as final products 17-ethyl-17-hydroxy-16,17-secoestr-4-en-3-one and 17,17-diethyl-17-hydroxy-16,17-secoestr-4-en-3-one, and 17-propyl-17-hydroxy-16,17-secoestr-4-en-3-one and 17,17-dipropyl-17-hydroxy-16,17-secoestr-4-en-3-one, respectively.

PREPARATION 7

A mixture of 5 g. of 14β-estrone-3-methylether, 75 ml. of isopropenyl acetate and 0.8 g. of p-toluenesulfonic acid is heated to reflux temperature and the reaction mixture is refluxed for 18 hours using a water separator, at the end of which time the resulting solution is cooled, diluted with ethyl acetate and washed with water, sodium bicarbonate solution and water to neutrality, dried over sodium sulfate and evaporated to dryness under vacuo, to yield 3-methoxy-17-acetoxy-14β-ester-1,3,5(10),16-tetraene which may be purified by crystallization from acetone-ether.

To a solution of 3 g. of 3-methoxy-17-acetoxy-14-β-estra-1,3,5(10),16-tetraene in 60 ml. of pyridine are added 4 g. of osmium tetroxide and the reaction mixture is kept at room temperature for 48 hours, under stirring. Then, 8 g. of sodium bisulfite dissolved in 120 ml. of water and 80 ml. of pyridine are added, and the mixture is stirred at room temperature for 24 hours further. The product is then extracted with ethyl acetate, and the combined organic extracts washed with water to neutral, dried and evaporated to dryness. The residue is purified by t.l.c. eluting the product with hexane-ethyl acetate 75:25, thus producing 3 - methoxy - 14β-estra-1,3,5(10)-trien-16α-ol-17-one.

A solution of 1.19 g. of 3-methoxy-14β-estra-1,3,5(10)-trien-16α-ol-17-one in 20 ml. of pyridine is treated, at room temperature with 915 mg. (one molar equivalent) of periodic acid ($HIO_4.2H_2O$) dissolved in 10 ml. of water. The reaction mixture is kept at room temperature for 20 hours, and the solvent is then eliminated under reduced pressure, taking care that the temperature is maintained below 30° C. The residue is extracted with ethyl acetate, and the organic extracts are washed with 5% sodium bicarbonate solution, 5% sodium thiosulfate solution and water, dried over sodium sulfate and evaporated to dryness under vacuo, to yield 3-methoxy-16-hydroxy - 17 - oxa-17α-keto-D-homo-14β-estra-1,3,5(10)-triene, which is used for the next step without further purification.

A solution of the foregoing crude lactol in 20 ml. of methylene chloride is treated with 20 ml. of an ethereal solution of diazomethane, and the mixture is kept at room temperature for one hour. The excess diazomethane is then destroyed by adding a few drops of acetic acid, the solvents are eliminated under vacuo, and the residue is purified by t.l.c., to yield 3-methoxy-16,17-seco-14β-estra-1,3,5(10)-trien-16-al-17-oic acid methyl ester.

To a solution of 1 g. of 3-methoxy-16,17-seco-14β-estra-1,3,5(10)-trien-16-al-17-oic acid methyl ester in 5 ml. of ethyl ether are added 0.5 ml. of benzyl mercaptan and three drops of boron trifluoride etherate, and the mixture is kept at room temperature for 20 hours. It is then diluted with ether and the ethereal solution washed several times with 5% potassium hydroxide solution and water to neutral, dried and evaporated to dryness. The residue is dissolved in 150 ml. of ethanol, 5 g. of Raney nickel are added and the mixture is then refluxed under stirring for 24 hours. The suspension is then filtered through Celite diatomaceous earth, and the nickel is washed well with hot ethanol. The combined filtrate and washings are evaporated to dryness, and the residue purified by chromatography on Florisil, thus producing 3-methoxy - 16,17-seco-14β-estra-1,3,5(10)-trien-17-oic acid methyl ester.

In a similar manner, starting from 3-methoxy-13-ethyl-14β-gona-1,3,5(10)-trien-17-one there is obtained 3-methoxy-13-ethyl-16,17-seco-14β-gona-1,3,5(10)-trien-17-oic acid methyl ester as final product.

In accordance with the procedure set forth in Preparation 1, parts C, D, and E, 3-methoxy-16,17-seco-14β-estra-1,3,5(10)-trien-17-oic acid methyl ester and 3-methoxy-13 - ethyl-16,17-seco-14β-gona-1,3,5(10)-trien-17-oic acid methyl ester are converted respectively into 16,17-seco-14β - estr - 4-en-17-ol-3-one and 13-ethyl-16,17-seco-14β-gon-4-en-17-ol-3-one.

PREPARATION 8

Preparations 2 to 6 are repeated using the 14β-isomers of the starting materials used therein, thus producing the corresponding 14β-products thereof, e.g.

17-methyl-17-hydroxy-16,17-seco-14β-estr-4-en-3-one,
17,17-dimethyl-17-hydroxy-16,17-seco-14β-estr-4-en-3-one,
13-ethyl-17-methyl-17-hydroxy-16,17-seco-14β-gon-4-en-3-one,
13-ethyl-17,17-dimethyl-17-hydroxy-16,17-seco-14β-gon-4-en-3-one,
16,17-seco-14β-estr-4-en-3-one,
13-ethyl-16,17-seco-14β-gon-4-en-3-one,
17-methyl-17-phenyl-16,17-seco-14β-estr-4-en-17-ol-3-one,
17-methyl-16,17-seco-14β-estr-4-ene-3,17-dione,
17-ethyl-17-hydroxy-16,17-seco-14β-estr-4-en-3-one, and
17,17-diethyl-17-hydroxy-16,17-seco-14β-estr-4-en-3-one.

PREPARATION 9

Part A

A solution of 5 g. of 17-tetrahydropyran-2'-yloxy-16,17-secoestr-4-en-3-one in 100 ml. of anhydrous toluene and 25 ml. of anhydrous hexamethylphosphoramide is cooled to —25° C. in a Dry Ice-acetone bath, 6.5 ml. of methyl iodide are added and to the cooled mixture is added dropwise in a 20 minute period, a previously prepared solution of 2 g. of potassium metal in 50 ml. of t-butanol under stirring and under an atmosphere of nitrogen. The reaction mixture is stirred for 4 hours further at the same temperature, under nitrogen. It is then diluted with water and the solvents eliminated by steam distillation. The product is extracted with methylene chloride and the organic extract washed with water to neutral, dried over sodium sulfate and evaporated to dryness under vacuo. The residue is purified by chromatography on Florisil, to yield 2,2-dimethyl-17-tetrahydropyran-2'-yloxy-16,17-secoestr-4-en-3-one and 2α-methyl-17-tetrahydropyran-2'-yloxy-16,17-secoestr-4-en-3-one.

Part B

To a solution of 1 g. of 2,2-dimethyl-17-tetrahydropyran-2'-yloxy-16,17-secoestr-4-en-3-one in 50 ml. of methanol is added 1 ml. of 2N hydrochloric acid, and the mixture is kept at room temperature for 2 hours. It is then diluted with water and extracted with methylene chloride. The organic extracts are washed with water to neutral, dried and evaporated to dryness under vacuo, thus yielding 2,2-dimethyl-17-hydroxy-16,17-secoestr-4-en-3-one.

By following the method of Part A, the following compounds are prepared:

2,2-dimethyl-16,17-secoestr-4-en-3-one,
2,2-dimethyl-17-methoxy-16,17-secoestr-4-en-3-one,
2,2,17-trimethyl-16,17-secoestr-4-en-3-one,
2,2,17,17-tetramethyl-17-acetoxy-16,17-secoestr-4-en-3-one, and
the corresponding 2α-monomethyl compounds.

EXAMPLE 1

A suspension of 5 g. of 16,17-secoestr-4-en-17-ol-3-one in 70 ml. of anhydrous methylene chloride is treated with 5 ml. of freshly distilled ethyl orthoformate and 100 mg. of p-toluenesulfonic acid. The reaction mixture is stirred at room temperature for 15 minutes and to the resulting solution are added a few drops of pyridine. The solvents are evaporated to dryness under reduced pressure, and the crude product filtered through a column of 20 g. of Florisil, using hexane as eluant, to give 3-ethoxy-16,17-secoestra-3,5-dien-17-ol and 3-ethoxy-17-formyloxy-16,17-secoestra-3,5-diene.

EXAMPLE 2

A solution of 5 g. of the mixture of 3-ethoxy-16,17-secoestra-3,5-dien-17-ol and 3-ethoxy-17-formyloxy-16,17-secoestra-3,5-diene in 200 ml. of dioxane is cooled to 8° C., in an ice bath and treated with 3.71 g. of 2,3-dichloro-5,6-dicyano-1,4-benzoquinone and 0.5 g. of p-toluenesulfonic acid. The reaction mixture is stirred at the same temperature for 3 hours. Methylene chloride is then added and the solid material separated by filtration. The filtrate is evaporated under reduced pressure and the residue purified by t.l.c. to yield 16,17-secoestra-4,6-dien-17-ol-3-one and 17-formyloxy-16,17-secoestra-4,6-dien-3-one.

EXAMPLE 3

A mixture of 500 mg. of 17-formyloxy-16,17-secoestra-4,6-dien-3-one and 10 ml. of a 2% methanolic potassium hydroxide solution is kept at room temperature for 1 hour. The reaction mixture is then concentrated to a small volume under reduced pressure and diluted with water. The formed precipitate is collected by filtration, washed with water and air dried. Crystallization from methylene chloride-ether affords pure 16,17-secoestra-4,6-dien-17-ol-3-one, identical to the product obtained in Example 2.

EXAMPLE 4

A solution of 1 g. of 17-acetoxy-16,17-secoestr-4-en-17-ol-3-one in 8 ml. of anhydrous peroxide free dioxane is treated with 1.2 ml. of freshly distilled ethyl orthoformate, and 0.8 g. of p-toluenesulfonic acid. The reaction mixture is stirred at room temperature for 15 minutes and then allowed to stand at the same temperature for 30 minutes further, at the end of which time 0.5 ml. of pyridine are added. The mixture is then diluted with water and the formed precipitate collected by filtration, washed with water and air dried thus obtaining 3-ethoxy-17-acetoxy-16,17-secoestra-3,5-diene.

The latter compound is then treated with 1 molar equivalent of 2,3-dichloro-5,6-dicyano-1,4-benzoquinone, in accordance with the method of Example 2, to furnish 17-acetoxy-16,17-secoestra-4,6-dien-3-one.

A solution of 1.1 g. of 17-acetoxy-16,17-secoestra-4,6-dien-3-one in 50 ml. of methanol is treated with 500 mg. of potassium hydroxide dissolved in 1 ml. of water and the reaction mixture is kept at room temperature for 45 minutes. It is then poured into ice water and the product extracted with ethyl acetate. The organic extract is washed with water to neutral, dried and evaporated to dryness, to give a crude compound which upon recrystallization from methylene chloride ether affords 16,17-secoestra-4,6-dien-17-ol-3-one, identical to those obtained in the previous Examples.

To a cold solution of 0.5 g. of 16,17-secoestra-4,6-dien-17-ol-3-one in 12 ml. of pyridine is added 1.5 ml. of heptanoyl chloride and the reaction mixture is allowed to stand for 18 hours at room temperature. The reaction mixture is then concentrated to a small volume under vacuo, diluted with water and extracted with methylene chloride; the organic extracts are washed with water to neutrality, dried over sodium sulfate and evaporated to dryness under reduced pressure. Crystallization of the residue from acetone-hexane gives 17-heptanoyloxy-16,17-secoestra-4,6-dien-3-one.

EXAMPLE 5

To a solution of 5 g. of 3-keto-16,17-secoestr-4-en-17-oic acid in 50 ml. of methylene chloride is added an excess of an ethereal solution of diazomethane and the reaction mixture is kept at room temperature for 1 hour. The excess diazomethane is then destroyed by adding 1 ml. of acetic acid, and the solvent eliminated under vacuo, thus obtaining 3-keto-16,17-secoestr-4-en-17-oic acid methyl ester.

The foregoing compound is converted into 3-ethoxy-16,17-secoestra-3,5-dien-17-oic acid methyl ester by following the method of Example 1.

A solution of 3 g. of 3-ethoxy-16,17-secoestra-3,5-dien-17-oic acid methyl ester in 60 ml. of tetrahydrofuran is cooled to 0° C. and treated with 1.05 molar equivalents of 2,3-dichloro-5,6-dicyano-1,4-benzoquinone and 0.3 g. of p-toluenesulfonic acid. The resulting mixture is further stirred at 0° C. for 3 hours. The precipitate hydroquinone is filtered off and 200 ml. of methylene chloride are added to the filtrate. The organic solution is washed with 5% aqueous sodium hydroxide solution until the washings are colorless and then with water to neutral, dried over sodium sulfate and evaporated to dryness under vacuo. Crystallization of the residue from acetone-hexane affords 3-keto-16,17-secoestra-4,6-dien-17-oic acid methyl ester.

EXAMPLE 6

By following the method of Example 1, 13-ethyl-16,17-secogon-4-en-17-ol-3-one,
13-n-propyl-16,17-secogon-4-en-17-ol-3-one,
16,17-seco-14β-estr-4-en-17-ol-3-one and
2,2-dimethyl-16,17-secoestr-4-en-17-ol-3-one are converted respectively into:

3-ethoxy-13-ethyl-16,17-secogona-3,5-dien-17-ol and
3-ethoxy-13-ethyl-17-formyloxy-16,17-secogona-3,5-diene,
3-ethoxy-13-n-propyl-16,17-secogona-3,5-dien-17-ol and
3-ethoxy-13-n-propyl-17-formyloxy-16,17-secogona-3,5-diene,
3-ethoxy-16,17-seco-14β-3,5-dien-17-ol, and
3-ethoxy-17-formyloxy-16,17-seco-14β-estra-3,5-diene; and
2,2-dimethyl-3-ethoxy-16,17-secoestra-3,5-dien-17-ol and
2,2-dimethyl-3-ethoxy-17-formyloxy-16,17-secoestra-3,5-diene.

Upon reaction of the above-mentioned enol ethers with 1 molar equivalent of 2,3-dichloro-5,6-dicyano-1,4-benzoquinone in accordance with the method of Example 2, the following compounds are obtained:

13-ethyl-16,17-secogona-4,6-dien-17-ol-3-one,
13-ethyl-17-formyloxy-16,17-secogona-4,6-dien-3-one,
13-n-propyl-16,17-secogona-4,6-dien-17-ol-3-one,
13-n-propyl-17-formyloxy-16,17-secogona-4,6-dien-3-one,
16,17-seco-14β-estra-4,6-dien-17-ol-3-one,
17-formyloxy-16,17-seco-14β-estra-4,6-dien-3-one,
2,2-dimethyl-16,17-secoestra-4,6-dien-17-ol-3-one, and
2,2-dimethyl-17-formyloxy-16,17-secoestra-4,6-dien-3-one, respectively.

EXAMPLE 7

In accordance with the methods of Examples 1 and 2, the following compounds are prepared:

17-methyl-16,17-secoestra-4,6-dien-17-ol-3-one,
17,17-dimethyl-16,17-secoestra-4,6-dien-17-ol-3-one,
13-ethyl-17-methyl-16,17-secogona-4,6-dien-17-ol-3-one,
13-ethyl-17,17-dimethyl-16,17-secogona-4,6-dien-17-ol-3-one,
13-n-propyl-17-methyl-16,17-secogona-4,6-dien-17-ol-3-one,
16,17-secoestra-4,6-dien-3-one,
13-ethyl-16,17-secogona-4,6-dien-3-one,
13-n-propyl-16,17-secogona-4,6-dien-3-one,
17-methyl-16,17-secoestra-4,6-dien-3-one,
13-ethyl-17-methyl-16,17-secogona-4,6-dien-3-one,
17-methyl-17-phenyl-16,17-secoestra-4,6-dien-17-ol-3-one,
13-ethyl-17-methyl-17-phenyl-16,17-secogona-4,6-dien-17-ol-3-one,
17-methyl-16,17-secoestra-4,6-diene-3,17-dione,
13-ethyl-17-methyl-16,17-secogona-4,6-diene-3,17-dione,
13-n-propyl-17-methyl-16,17-secogona-4,6-diene-3,17-dione,
17-ethyl-16,17-secoestra-4,6-dien-17-ol-3-one,
17-propyl-16,17-secoestra-4,6-dien-17-ol-3-one,
17,17-dipropyl-16,17-secoestra-4,6-dien-17-ol-3-one,
17-methyl-16,17-seco-14β-estra-4,6-dien17-ol-3-one,
17,17-dimethyl-16,17-seco-14β-estra-4,6-dien-17-ol-3-one,
16,17-seco-14β-estra-4,6-dien-3-one,
2,2-dimethyl-16,17-secoestra-4,6-dien-3-one,
2,2-dimethyl-17-methoxy-16,17-secoestra-4,6-dien-3-one,
2,2,17-trimethyl-16,17-secoestra-4,6-dien-3-one, and
2,2,17,17-tetramethyl-17-acetoxy-16,17-secoestra-4,6-dien-3-one starting from the corresponding $\Delta^4$-3-keto compounds.

EXAMPLE 8

A mixture of 8.6 g. of 17-methyl-16,17-secoestra-4,6-dien-17-ol-3-one, 60 ml. of pyridine and 30 ml. of acetic anhydride is kept at room temperature for 18 hours. The mixture is then poured into ice water, and the formed precipitate collected by filtration, washed with water and dried. Crystallization from ether affords 17-acetoxy-17-methyl-16,17-secoestra-4,6-dien-3-one.

In a similar manner, 13-ethyl-16,17-secogona-4,6-dien-17-ol-3-one,
13-n-propyl-16,17-secogona-4,6-dien-17-ol-3-one,
2,2-dimethyl-16,17-secoestra-4,6-dien-17-ol-3-one,
13-ethyl-17-methyl-16,17-secogona-4,6-dien-17-ol-3-one,
13-n-propyl-17-methyl-16,17-secogona-4,6-dien-17-ol-3-one,
16,17-seco-14β-estra-4,6-dien-17-ol-3-one,
17-ethyl-16,17-seco-14β-estr-4,6-dien-17-one, and
17-methyl-16,17-seco-14β-estra-4,6-dien-17-ol-3-one are converted into the corresponding acetates.

By the same method but using propionic, caproic and cyclopentylpropionic anhydride instead of acetic anhydride the corresponding propionates, caproates and cyclopentylpropionates of the above-mentioned compounds are obtained.

EXAMPLE 9

A mixture of 1 g. of 17,17-dimethyl-16,17-secoestra-4,6-dien-17-ol-3-one, 2 ml. of acetic anhydride, 5 ml. of acetic acid and 1 g. of p-toluenesulfonic acid is kept at room temperature for 2 hours. The reaction mixture is then diluted with water, extracted with methylene chloride and the organic extracts washed with water, sodium carbonate solution and water to neutrality, dried over sodium sulfate and evaporated to dryness under vacuo. Crystallization of the residue from acetone-ether gives 17,17-dimethyl-17-acetoxy-16,17-secoestra-4,6-dien-3-one.

By using propionic anhydride and enanthic anhydride in place of acetic anhydride the corresponding propionate and enanthate of 17,17-dimethyl-17-hydroxy-16,17-secoestra-4,6-dien-3-one are obtained.

In a similar manner are produced the acetates, propionates and enanthates of 13-ethyl-17,17-dimethyl-16,17-secogono-4,6-dien-17-ol-3-one, 17-methyl-17-phenyl-16,17-secoestra-4,6-dien-17-ol-3-one and 13-ethyl-17-methyl-17-phenyl-16,17-secogona-4,6-dien-17-ol-3-one.

EXAMPLE 10

Two milliliters of dihydropyran are added to a solution of 1 g. of 16,17-secoestra-4,6-dien-17-ol-3-one in 15 ml. of benzene. About 1 ml. of benzene is distilled to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane and hexane-ether 80:20 to yield 17-tetrahydropyran-2'-yloxy-16,17-secoestra-4,6-dien-3-one.

In a similar fashion, 13-ethyl-16,17-secogona-4,6-dien-17-ol-3-one, 17-methyl-16,17-secoestra-4,6-dien-17-ol-3-one, 17-methyl-17-phenyl-16,17-secoestra-4,6-dien-17-ol-3-one, 16,17-seco-14β-estra-4,6-dien-17-ol-3-one and 17,17-dimethyl-16,17-seco-14β-estra-4,6-dien-17-ol-3-one are converted into the corresponding tetrahydropyranylethers.

EXAMPLE 11

Two milliliters of dihydrofuran are added to a solution of 1 g. of 16,17-secoestra-4,6-dien-17-ol-3-one in 15 ml. of benzene. About 1 ml. of benzene is distilled to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 17-tetrahydrofuran-2'-yloxy-16,17-secoestra-4,6-dien-3-one which is recrystallized from pentane.

Similarly, 17-(4'-methoxy-tetrahydropyran-4'-yloxy)-16,17-secoestra-4,6-dien-3-one is prepared by utilization of the foregoing procedure employing 4-methoxy-5,6-dihydro-2H-pyran in lieu of dihydrofuran.

By the same method, the 17-tetrahydrofuranyl and 17-(4'-methoxy-tetrahydropyranyl) ethers of the 17-hydroxy-$\Delta^{4,6}$-3-keto compounds of Examples 6 and 7 are prepared.

EXAMPLE 12

A solution of one chemical equivalent of 16,17-secoestra-4,6-dien-17-ol-3-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene, over a period of 20 minutes. The mixture is allowed to reflux for 20 hours after which time the precipitate of sodium bromide is removed by filtration and the organic phase dried and evaporated to yield 17-cyclopentyloxy-16,17-secoestra-4,6-dien-3-one which is further purified upon recrystallization from pentane.

Alternatively, methyl iodide and ethyl iodide can be used in lieu of cyclopentyl bromide to product 17-methoxy-16,17-secoestra-4,6-dien-3-one and 17-ethoxy-16,17-secoestra-4,6-dien-3-one respectively.

Likewise, the 17-cyclopentyl, methyl and ethyl ethers of 16,17-seco-14β-estra-4,6-dien-17-ol-3-one and 13-ethyl-16,17-secogona-4,6-dien-17-ol-3-one are obtained.

EXAMPLE 13

A solution of 5 g. of 17-tetrahydropyran-2'-yloxy-16,17-secoestra-4,6-dien-3-one in 100 ml. of anhydrous toluene and 25 ml. of anhydrous hexamethylphosphoramide is cooled to —25° C. in a Dry-Ice acetone bath, 6.5 ml. of methyl iodide are added and to the cooled mixture is added dropwise in a 20 minute period, a previously prepared solution of 2 g. of potassium metal in 50 ml. of t-butanol under stirring and under an atmosphere of nitrogen. The reaction mixture is stirred for 4 hours further at the same temperature, under nitrogen. It is then diluted with water and the solvents eliminated by steam distillation. The product is extracted with methylene chloride and the organic extract washed with water to neutral, dried over sodium sulfate and evaporated to dryness under vacuo. The residue is purified by chromatography on Florisil, to yield 2,2-dimethyl-17-tetrahydropyran-2'-yloxy-16,17-secoestra-4,6-dien-3-one and 2α-methyl-17-tetrahydropyran-2'-yloxy-16,17-secoestra-4,6-dien-3-one.

Likewise, starting from the corresponding Δ[4,6]-dienes, the following compounds are obtained:

2,2-dimethyl-13-ethyl-16,17-secogona-4,6-dien-3-one and 2α-methyl-13-ethyl-16,17-secogna-4,6-dien-3-one;
2,2-dimethyl-16,17-seco-14β-estra-4,6-dien-3-one and 2α-methyl-16,17-seco-14β-estra-4,6-dien-3-one,
2,2,17-trimethyl-13-n-propyl-16,17-secogona-4,6-diene-3,17-dione and 2α,17-dimethyl-13-n-propyl-16,17-secogona-4,6-diene-3,17-dione;
2,2-dimethyl-17-ethyl-17-acetoxy-16,17-secoestra-4,6-dien-3-one and 2-α-methyl-17-ethyl-17-acetoxy-16,17-secoestra-4,6-dien-3-one,
2,2-dimethyl-17-propyl-17-acetoxy-16,17-secoestra-4,6-dien-3-one and 2α-methyl-17-propyl-17-acetoxy-16,17-secoestra-4,6-dien-3-one.

EXAMPLE 14

A solution of 2 g. of 16,17-secoestra-4,6-dien-17-ol-3-one in 40 ml. of acetone distilled over potassium permanganate is treated at room temperature under an atmosphere of nitrogen and with stirring, with an 8N solution of chromic acid (prepared by mixing 26 g. of chromium trioxide with 23 ml. of concentrated sulfuric acid and diluting with water to 100 ml.), until the color of the reagent persisted in the mixture. It is stirred for 2 hours further at the same temperature and diluted with sodium bisulfite solution and water. The product is then extracted with methylene chloride and the organic extract washed with water, dried over sodium sulfate and evaporated under vacuum, thus affording a crude product which upon recrystallization from acetone-hexane gives the 3-keto-16,17-secoestra-4,6-dien-17-oic acid.

To a solution of 1 g. of 3-keto-16,17-secoestra-4,6-dien-17-oic acid in 20 ml. of ether is added 20 ml. of an ethereal solution of diazomethane, and the mixture is kept at room temperature for 1 hour. The excess diazomethane is then destroyed by adding a few drops of acetic acid, and the solvent eliminated under vacuo, thus obtaining 3-keto-16,17-secoestra-4,6-dien-17-oic acid methyl ester, identical to the obtained in Example 5.

By the same methods, 13-ethyl-16,17-secogona-4,6-dien-17-ol-3-one, 16,17-seco-14β-estra-4,6-dien-17-ol-3-one and 2,2-dimethyl-16,17-secoestra-4,6-dien-17-ol-3-one are converted first into the corresponding acids, and then into the methyl esters.

When using diazoethane in lieu of diazomethane, the ethyl esters are obtained. Alternatively, by treating the acid salts (conventionally formed) with alkyl halide, the acid esters are formed.

EXAMPLE 15

To a solution of 1 g. of 17-acetoxy-16,17-secoestra-4,6-dien-3-one in 28 ml. of anhydrous tetrahydrofuran cooled to —35° C. is added dropwise under an atmosphere of nitrogen, 8 ml. of methyl iodide, and the mixture is stirred for 1.5 hours at —35° to —30° C. The mixture is then treated at the same temperature with a previously prepared mixture of 4 g. of potassium-t-butoxide, 28.5 ml. of anhydrous tetrahydrofuran and 11 ml. of hexamethylphosphoramide. The reaction mixture is stirred at room temperature for an additional hour, diluted with water and extracted with methylene chloride. the combined organic extracts are washed with water to neutral, dried over sodium sulfate and evaporated to dryness. The residue is purified by t.l.c., using hexane-ethyl acetate, 80:20 as gradient to yield 2α,2β - dimethyl-17-acetoxy-16,17-secoestra-4,6-dien-3-one and 2α-methyl-17-acetoxy-16,17-secoestra-4,6-dien-3-one.

17 - Acetoxy-16,17-secoestra-4,6-dien-3-one (200 mg.) in 560 ml. of anhydrous tetrahydrofuran is placed under a nitrogen atmosphere with 113 ml. of methyl iodide. The mixture is maintained at —35° C. (±5°) while a solution of 57 g. of potassium t-butoxide, 570 ml. of tetrahydrofuran, and 140 ml. of hexamethylphosphortriamide is added thereto with stirring over 1.5 hours. The mixture is then allowed to stand at room temperature for one hour after which time it is poured into water and extracted with petroleum ether. The extracts are washed with water and evaporated to dryness in vacuum to give 2,2-dimethyl-17-acetoxy-16,17-secoestra-4,6-dien-3-one and 2α-methyl-17-acetoxy-16,17-secoestra-4,6-dien-3-one.

What is claimed is:

1. A compound selected from the group of compounds represented by the following formula:

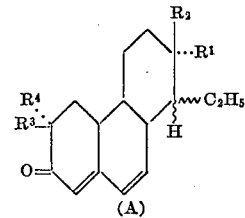

(A)

wherein
$R^1$ is a hydroxylated hydrocarbon radical represented by the formulas:

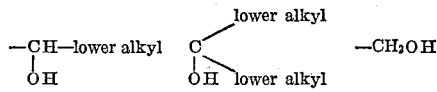

and the hydrolyzable hydrocarbon carboxylic acid esters thereof wherein the carboxylic acid moiety has from 1 to 12 carbon atoms,
$R^2$ is lower alkyl;
$R^3$ and $R^4$ are hydrogen or methyl, provided that $R^4$ is methyl when $R^3$ is methyl.

2. A compound according to Claim 1 wherein the hydrogen atom at C-14 is in α configuration and the ethyl group is in β configuration.

3. A compound according to Claim 2 wherein $R^1$ is hydroxymethyl, $R^2$ is methyl, $R^3$ and $R^4$ are each hydrogen; 17-hydroxy-16,17-secoestra-4,6-dien-3-one.

4. A compound according to Claim 2, wherein $R^1$ is hydroxymethyl, $R^2$, $R^3$, and $R^4$ are each methyl; 2,2-dimethyl-17-hydroxy-16,17-secoestra-4,6-dien-3-one.

5. A compound according to Claim 2, wherein $R^1$ is formyloxymethyl, $R^2$ is methyl, $R^3$ and $R^4$ are each hydrogen; 17-formyloxy-16,17-secoestra-4,6-dien-3-one.

6. A compound according to Claim 2, wherein $R^1$ is acetoxymethyl, $R^2$ is methyl, $R^3$ and $R^4$ are each hydrogen; 17-acetoxy-16,17-secoestra-4,6-dien-3-one.

7. A compound according to Claim 2 wherein $R^1$ is acetoxymethyl, $R^2$ is methyl, $R^3$ and $R^4$ are each methyl; 2,2-dimethyl-17-acetoxy-16,17-secoestra-4,6-dien-3-one.

8. A compound according to Claim 2 wherein $R^1$ is heptanoyloxymethyl, $R^2$ is methyl, $R^3$ and $R^4$ are each hydrogen; 17-heptanoyloxy - 16,17 - secoestra-4,6-dien-3-one.

9. A compound according to Claim 2 wherein $R^1$ is the group

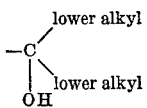

in which each lower alkyl is methyl, $R^2$ is methyl and $R^3$ and $R^4$ are each hydrogen; 17-hydroxy-17,17-dimethyl-16,17-secoestra-4,6-dien-3-one.

10. A compound according to Claim 1 wherein the hydrogen atom at C-14 is in $\beta$ configuration and the ethyl group is in $\alpha$ configuration.

11. A compound according to Claim 1 wherein $R^1$ is hydroxymethyl or the esters thereof.

12. A compound according to Claim 1 wherein $R^1$ is the group

lower alkyl and the esters thereof, $R^3$ and $R^4$ are each hydrogen and the hydrogen atom at C–14 is in $\alpha$ configuration.

13. A compound according to Claim 12 wherein $R^2$ is methyl.

References Cited
UNITED STATES PATENTS

| | | | |
|---|---|---|---|
| 2,830,074 | 4/1958 | Farinacchi | 260—586 H |
| 3,192,257 | 6/1965 | Zderic | 260—586 H |

FOREIGN PATENTS

| | | | |
|---|---|---|---|
| 263,229 | 10/1963 | Australia | 260—586 H |

OTHER REFERENCES

Chem. Abstracts, 61:14750h–17751b (1964).
Chem. Abstracts, 63:13347d–13348g (1965).
Chem. Abstracts, 70:68610Z (1969).
Chem. Abstracts, 67:91020–91021 (1967).

VIVIAN GARNER, Primary Examiner

U.S. Cl. X.R.

260—343.25, 345.9, 347.8, 404, 408, 410, 468.5, 471 R, 476 C, 482 R, 484 R, 487, 488 CD, 514.5, 586 H, 600, 611 A, 611 F, 612 R; 424—299, 305, 308, 309, 311 312, 314